L. O. ALLEN.
Churn.
No. 53,766.
Patented April 10, 1866.
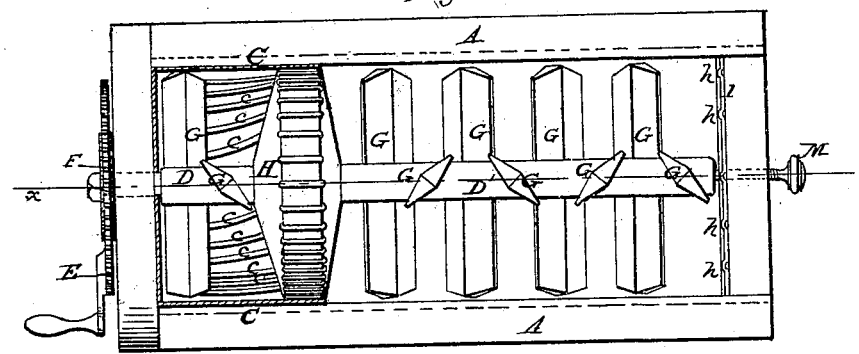
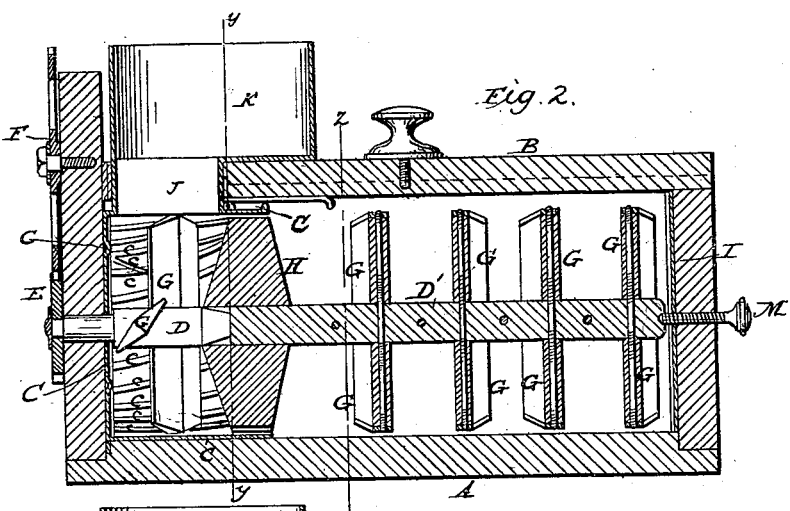
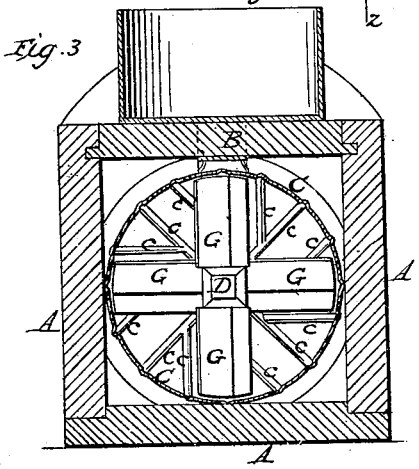
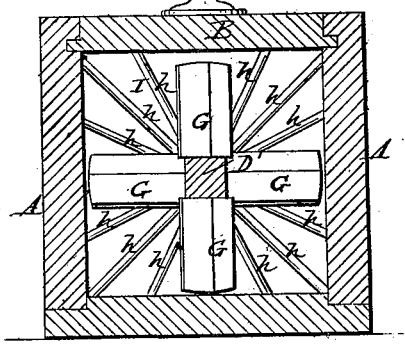
Inventor
Levi O. Allen

UNITED STATES PATENT OFFICE.

LEVI O. ALLEN, OF GARDINER, MAINE.

IMPROVEMENT IN CHURNS.

Specification forming part of Letters Patent No. 53,766, dated April 10, 1866.

*To all whom it may concern:*

Be it known that I, LEVI O. ALLEN, of Gardiner, in the county of Kennebec and State of Maine, have invented new and useful Improvements in Churns; and I do hereby declare the following to be a full, clear, and exact description of the nature, construction, and operation of the same, reference being had to the annexed drawings, which are made part of this specification, and in which—

Figure 1 is a top view, the lid being removed. Fig. 2 is a longitudinal vertical section on the line $x$ $x$, Fig. 1. Fig. 3 is a transverse section on the line $y$ $y$, Fig. 2. Fig. 4 is a transverse section on the line $z$ $z$, Fig. 2.

The same letters refer to corresponding parts in the different figures.

The invention consists of a water-tight box, one end containing a cylindrical compressing-space, divided from the main chamber by a disk upon the beater-shaft, which is provided in each of the spaces with adjustable beaters.

To enable one skilled in the art to which my invention appertains to construct and use the same, I will proceed to describe it in detail.

A A are the sides and bottom of the box, and B is a sliding lid. One end of the box is occupied by a cylindrical curb, C, whose end and interior periphery has ridges $c$ $c$.

Occupying a central position in the box is a horizontal shaft, D D′, of which the portion D, extending the length of the cylindrical curb, is socketed into the other portion, D′, which extends the length of the main chamber of the churn and is suitably journaled in the far end.

The gearing E F serves to revolve the shaft, which is provided with radial beaters G of nearly rhombic transverse section, attached to the beater-shaft by means presently to be described, which admit of their being set at the required angle to cut the milk or cream, with their major axis coincident with the plane of their revolution, or, by being set in the position shown in the figures, be adapted to throw the cream toward one end or the other of the box.

Attached to the shaft D′, and revolving within the open end of the curb C, is a disk, H, with a flattened periphery, which has grooves upon it.

The far end of the chamber has a zinc plate, I, which is provided with radial ridges $h$. The curb is likewise made of sheet-zinc.

At the upper part of the curb C is a spout, J, which receives the cream from a vessel, K.

The cream first passes into the curb C, where it is agitated by the beaters G on the shaft D and brought into violent contact with the ridged sides of the chamber and one face of the disk H, and, eventually escaping between the periphery of the disk H and the inside of the curb, is compressed thereby. The cream is subjected to such an active pressure and agitation as to break the globules and release the butter.

The beaters on the shorter shaft D are two in number, and are set on at an angle to the shaft, as shown in Fig. 2, so as to compress the cream against the ribbed plate to drive it toward the annular opening between the disk H and the curb C, whence it escapes into the larger chamber, where the butter is gathered.

The beaters, after being adjusted as described, are fixed in the required position against the square-sided shaft by means of the bolts, which pass longitudinally through them, with a nut and washer on the respective ends of each. (See Fig. 2.)

The ribbed plates in each end of the churn tend to deflect and break up the body of cream passing against them, and thereby increase the agitation.

The operation performed, the set-screw M, at the end, is retracted, and the shaft D′ being removed, the butter is handled with ease.

According to the motion required or the state or quantity of the cream, the beaters may be set on in such a manner as to throw the cream to one end or the other, or both, or toward the center from both ends, also to divide it by the presentation of their acute edges, or revolve flatwise.

The floats are conveniently attached to the shafts by means of round iron rods with threads cut upon them on each end, onto which the beaters are screwed to the required adjustment.

Having described my invention, what I claim as new therein, and desire to secure by Letters Patent, is—

1. The compressing-curb C and disk H, acting in combination with the adjustable floats inclosed by them, as and for the purpose described.

2. The arrangement and mode of adjusting the floats relatively to each other and the containing-vessel, as and for the purpose described.

3. The ribbed plates in each end of the churn-box, in combination with the adjustable floats.

LEVI O. ALLEN.

Witnesses:
 DANIEL NUTTING,
 JOHN C. JONES.